(12) United States Patent
Jacquet

(10) Patent No.: US 7,718,063 B2
(45) Date of Patent: May 18, 2010

(54) TREATING POLLUTANTS BY PHYTOLEACHING

(75) Inventor: Thierry Jacquet, Paris (FR)

(73) Assignee: Phytorestore, Paris (FR)

( * ) Notice: Subject to any disclaimer, the term of this patent is extended or adjusted under 35 U.S.C. 154(b) by 194 days.

(21) Appl. No.: 11/662,974

(22) PCT Filed: Sep. 16, 2005

(86) PCT No.: PCT/FR2005/050756

§ 371 (c)(1),
(2), (4) Date: Nov. 26, 2007

(87) PCT Pub. No.: WO2006/030164

PCT Pub. Date: Mar. 23, 2006

(65) Prior Publication Data

US 2008/0197073 A1 Aug. 21, 2008

(30) Foreign Application Priority Data

Sep. 16, 2004 (FR) .................................. 04 09907
Sep. 16, 2004 (FR) .................................. 04 09908
Sep. 16, 2004 (FR) .................................. 04 09909

(51) Int. Cl.
*C02F 3/32* (2006.01)

(52) U.S. Cl. ............... 210/602; 210/630; 210/631; 210/170.08

(58) Field of Classification Search ........... 210/602, 210/610, 630, 631, 150, 151, 170.08, 903, 210/906, 908
See application file for complete search history.

(56) References Cited

U.S. PATENT DOCUMENTS

| 4,415,450 | A | | 11/1983 | Wolverton | |
|---|---|---|---|---|---|
| 5,863,433 | A | * | 1/1999 | Behrends | ............ 210/602 |
| 2002/0074287 | A1 | * | 6/2002 | Park et al. | ............ 210/605 |
| 2003/0230529 | A1 | * | 12/2003 | Austin et al. | ............ 210/602 |
| 2004/0000517 | A1 | * | 1/2004 | Austin et al. | ............ 210/602 |
| 2005/0082222 | A1 | * | 4/2005 | Austin | ............ 210/602 |

FOREIGN PATENT DOCUMENTS

| DE | 3423226 | 12/1985 |
|---|---|---|
| FR | 2690683 | 11/1993 |
| JP | 09047779 | 2/1997 |
| WO | WO-03042115 | 5/2003 |

* cited by examiner

*Primary Examiner*—Fred Prince
(74) *Attorney, Agent, or Firm*—Blank Rome LLP

(57) ABSTRACT

The invention relates to a method of depollution by phytoremediation intended for treating wastewater, polluted air or soil comprising a first step of introducing the pollutants in solid, liquid or gaseous form in a planted filter bed, and characterized in that it also comprises a step of irrigation of said planted filter bed so as to define aerobic or anaerobic periods, and to a device for carrying out that method.

15 Claims, 3 Drawing Sheets

TREATING POLLUTANTS BY PHYTOLEACHING

CROSS-REFERENCE TO RELATED APPLICATIONS

This application is a National Phase Application of PCT/FR2005/050756, filed on Sep. 16, 2005, which claims priority to FR 0409909, FR 0409907 and FR 0409908, all filed Sep. 16, 2004, which are hereby incorporated by reference.

The present invention relates to a method of treating polluted water, soil or air, and more particularly to a treatment method using a plant solution (phytoremediation). The invention relates more specifically to a device implementing said method for depolluting polluted water, soil or air.

The idea of using plants for environmental renovation is certainly quite old: 300 years ago, plants were already being used for water treatment.

Phytoremediation was recently defined as using superior plants to extract, stabilise or degrade substances that are polluting the environment. This technique has numerous advantages: it makes it possible to degrade a number of organic pollutants, it generates waste that is rich in recyclable metals; it can be applied to a large number of toxic metals; it only causes minimal disruption in the environment; it has a low cost, estimated at $60,000 to $100,000 per hectare for treating polluted soil, which represents about half the amount invested for the least expensive traditional method.

The focal point of phytoremediation is initially found at the soil/root interface with the stream of associated micro-organisms, which appears as the first point of interaction between the pollutants and the plant. The amount of soil influenced by the activities of the roots is defined by the term rhizosphere, and varies according to the mobility of the analysed elements. Thus, the rhizosphere can be limited to the first few millimeters of soil located around the roots in the case of less-mobile elements.

The influence of these micro-organisms on the plant comprises, among others, the following actions: (i) supply of nitrogen resulting from nitrogen fixation by rhizospheric bacteria (such as *Rhizobium, Frankia, Azospirillum*, etc.); (ii) synthesis of phytohormones (auxins, gibberellins, cytokinins, etc.); (iii) solubilisation of nutrients by means of chelating agents; (iv) antagonism towards pathogenic agents. The micro-organisms present in this area therefore play two essential roles, acting on the one hand on the chemical and even physical transformation of the soil and, on the other hand, on the nutrition of the plant, directly or indirectly.

In the context of depollution, the chemical transformations provided by these micro-organisms play a dominant role. An example of the above is the mineralization of organic matter, the immobilisation of inorganic compounds by the microflora, the oxidation or reduction of pollutants (*Pseudomonas fluorescens*, etc.), or even their assimilation and degradation.

One of the predominant uses of phytoremediation therefore consists in phytodegradation, which uses plants and their associated microflora to transform toxic substances in the rhizosphere into less toxic substances. The action of the rhizospheric micro-organisms therefore plays an essential role.

In the prior art, various depollution methods have therefore been provided with a view to improving the degradation of pollutants by these micro-organisms.

Thus, U.S. Pat. No. 4,415,450 describes a device wherein wastewater is conducted through a filter consisting of three layers of granular material, initially passing through the lower layers in an anaerobic medium allowing the hydrolysis of organic compounds and then through the top layer, planted with aquatic plants such as *Phragmite communis*, where oxidation reactions take place in an aerobic medium. Such methods boost the activity of these micro-organisms, allowing the degradation of certain pollutants. The use of reed-planted filter beds is already well known in the field of wastewater treatment.

However, certain pollutants, such as metals or certain inorganic pollutants with very low biodegradability, could not be degraded or eliminated using such methods, and it was necessary to develop new approaches to depolluting these specific pollutants.

Phytostabilisation uses a plant cover adapted to reduce the mobility of the metals present in the soil. The plants used are tolerant species having an exclusion strategy. Thus, the metals are trapped at root level, reducing the risk of leaching into underground water or even of being moved by wind or water erosion. This technique is often associated with adding components that are capable of immobilising metals such as Zn, Cu, Pb, Cd, Ni and As in the soil. Examples of such compounds include scoria, phosphates, beringite and steel filings.

Phytoextraction is based on using hyperaccumulating species, which extract large amounts of metal from the soil and concentrate them in their above-ground parts. Indeed, certain plant species are capable of accumulating large amounts of metal (up to several weight percentage points), while others are merely tolerant and can only accumulate limited amounts of metal elements. Above-ground parts concentrating large amounts of metal from the soil can then be harvested and subjected to heat, chemical or microbiological treatments. However, the main disadvantage of hyperaccumulating plants is their low biomass and their specialisation, which only allows them to treat one or two types of heavy metals. This is why the current phytoextraction strategy consists of using tolerant species with considerable biomass (such as Indian mustard, corn, sunflower, etc.), coupled with the addition of chelating agents, such as EDTA, to the soil to improve the accumulation of metals by the plants. Most projects applying this strategy have dealt with the extraction of lead. Another area of research for increasing phytoextraction consists of transferring the genes in charge of hyperaccumulation into tolerant plants with considerable biomass.

Finally, phytovolatilisation uses plants to transform metal elements (such as Se and Hg) into a gaseous form (such as dimethylselenide) allowing them to evaporate into the atmosphere.

But for all that, the plants only extract a limited amount of metal, at most several hundred kg per hectare per year. This factor limits the amount of pollutants that can be extracted in a "reasonable" timeframe. Soil or planted filter beds containing several metals would therefore require a large number of years in order to obtain complete depollution. Indeed, many of these metals tend to concentrate in soil or in the various layers of filters, most often in the form of precipitates, which makes them difficult to extract. The methods of the prior art therefore require very considerable timeframes, which can be up to almost fifteen years, in order to achieve suitable depollution. In addition, a number of these methods require the use of specific plants that are adapted to a specific pollutant, which makes them unsuitable for treating multiple pollutants.

Thus, there is still a need today for developping new phytoremediation methods that make it possible to obtain good depollution of a large range of pollutants, and which simultaneously ensure straightforward management of said pollutants, all the above combined with acceptable operating costs and short treatment times.

In the case of metals, their ionic fraction depends on redox potential changes in their environment. Thus, it is possible to increase the ionic fraction of metals and therefore their ionic fraction in reducing conditions.

Based on this observation, the Applicant has highlighted the possibility of modifying the redox potential of a planted filter bed and to improve depollution in the context of a phytoremediation process by watering the planted filter bed so as to define aerobic and anaerobic periods. Compared with the prior art, this is therefore a case of promoting the leaching of non-degradable elements present in the soil and consecutively trapping them in a filter downstream from the planted filter bed. This invention therefore relates to a new phytoremediation method used for the first time in a short treatment of pollutants. This is the source of the term phytoleaching, which has never been used before in scientific phytoremediation work for this type of treatment.

The method according to the invention therefore enables improved degradation of pollutants by the micro-organisms due to this alternation of aerobic/anaerobic periods and to depollute soil over a short period (between 1 and 2 years), water over a very short period (several hours to several days) and air almost instantly. The method according to the invention makes it possible, above all, due to the controlled modification of the redox potential of the environment, to improve the dissolution of non-degradable elements, in particular metal elements present in the soil, and therefore to promote their bioavailability for the plant species in this first compartment, but especially their leaching towards a second compartment acting as a filter and their subsequent trapping therein.

The method according to the invention therefore provides a much more complete solution in terms of depollution compared to the methods of the prior art. The treatment principle is assisted phytoleaching of the elements to be removed by means of vegetated compartments, pollutants which are then trapped in a filter, preferably a natural filter allowing them to be sequestered in non-bioavailable forms.

Therefore, the present invention relates to a method of depollution by phytoremediation intended for treating wastewater, polluted air and soil comprising a first step of introducing the pollutants in solid, liquid or gaseous form in a planted filter bed, and characterised in that it also comprises a step of irrigating said planted filter bed so as to define aerobic or anaerobic periods.

According to a specific embodiment of the method according to the invention, the method can comprise, prior to the insertion of the pollutants in the planted filter bed, a step of pre-treating said pollutants, which can consist of passing them through a screen rake, which can be followed by transferring them into a septic tank or a combined decanter-digester.

The alternation of aerobic periods with anaerobic periods enables, on the one hand, improved degradation of the pollutants in the planted filter bed by the plants and the micro-organisms of said planted filter bed, and the simultaneous dissolution of the non-degradable elements present in the soil, in particular the metal elements, so as to allow their leaching, and thus the washout of the planted filter bed during each cycle. Thus, the method according to the invention enables depollution, in particular by phytoremediation, of urban sludge, polluted soils, various industrial and farming effluents and cleaning products in order to obtain a quality cultivable material, which is to say with contents of trace elements (heavy metals) or any other type of pollutants (hydrocarbons, pesticides, radioactivity, etc.) that are close to the natural contents of soils and with non-bioavailable physical-chemical forms.

Irrigation enables saturation of the planted filter bed with water during the anaerobic period and, during the treatment of polluted soil or water, can be in the form of controlled flooding.

The organisation of cyclic irrigation periods corresponds to successive irrigation/drying of the planted filter bed, the periodicity of the cycles depending on the form of pollution to be treated. Typically, the method according to the invention uses irrigation/drying cycles of 4 hours to several months in the case of treating polluted sludge or soil, preferably 12 hours to 2 months and, in a particularly preferred manner, approximately one month. In the case of treating wastewater, the method according to the invention uses cycles of 4 hours to two months, preferably 1 to 15 days and, in a particularly preferred manner, approximately 1 to 7 days, Finally, in the case of treating polluted air, the method according to the invention uses cycles of 2 minutes to 24 hours, preferably 5 to 200 minutes and, in a particularly preferred manner, approximately 10 minutes.

This significant variation in cycles relates to the fact that, in the case of soil pollution, the dissolution of non-degradable elements requires significant washing time while, in the case of water pollution, the non-degradable elements are already found in a more easily soluble form, simplifying their leaching in the planted filter bed. Finally, and in the case of treating polluted air, as compared with wastewater, the introduction of polluted air considerably increases the drying speed of the planted filter bed, which requires a considerable de facto reduction of the irrigation/drying cycle times in order to have a feasible and operational planted filter bed.

In these various cycles, the irrigation/drying periods are distributed with a ratio of 2/1 to 1/50, preferably of 1/1 to 1/20, for example of 1/1 to 1/10, and in a particularly preferred manner of 1/1 to 1/5.

The method therefore enables, by a succession of aerobic and anaerobic phases, improved degradation of pollutants in the planted filter bed, but also to increase the variation of the redox potential during a cycle in the planted filter bed and thus to increase the dissolution of non-degradable elements in the planted filter bed and the leaching thereof.

Planted filter beds, in particular reed-planted filter beds for wastewater are well known to those skilled in the art and are made up of various layers of materials. Such planted filter beds are also sometimes called "filtering masses". In the simplest planted filter beds, their structure consists of a draining layer at the bottom and a layer that provides a support for the vegetation and the development of the rhizosphere. In the method according to the invention, the draining layer, which can contain drains, allows the leachates to be evacuated into a trapping filter during periods of saturation of the planted filter bed with water.

The vegetation of the planted filter beds is similar to that of wet environments with wet formation (such as Alnio-padion) protected by the RAMSAR convention, such as common reed (*Phragmite communis*), rush (*Scirpus communis*), sedge (*Carex acutiformis*), iris (*Iris speudaocorus*), willow (*Salix viminalis*), alder (*Aulnus glutinosa*) or black cherry (*Prunus padus*).

Advantageously, the planted filter bed uses a vertical-type filtration system from the draining layer towards the support layer or vice-versa. In the case of a vertical-type filtration system, depollution takes place by the pollutants simultaneously passing into the various layers. However, such a planted filter bed with a vertical-type filtration system can be positioned horizontally for depollution of wastewater, polluted soil or air, but also vertically for depollution of polluted air.

In the case of soil depollution, the polluted soil consists of the layer that provides a support for the vegetation and the pollutants are filtered from the support layer into the draining layer.

In the case of air depollution, on the other hand, the pollutants are filtered from the draining layer into the support layer with the polluted air being introduced in the draining layer.

Finally, in the case of depollution of wastewater, it can be carried out indifferently from the draining layer into the support layer or vice-versa, with introduction of the polluted water in the draining layer or in the support layer respectively.

The draining layer of the planted filter bed is advantageously connected to an aeration system. This aeration system connected to the base of the planted filter bed enables improved efficiency of the drying periods and, therefore, aerobic reactions throughout the entire planted filter bed.

In the case of the draining layer comprising drains that simplify the evacuation of leachates into a filter, said drains can also act as an aeration system. It is also possible to connect vents located on the surface of the planted filter bed to the draining layer and, according to a specific embodiment, to the drains which can be located in the latter.

The planted filter bed used in the method according to the invention advantageously comprises a layer, other than the draining layer, comprising material which can be organic, such as black peat or compost, or alluvial. Said layer preferably has the physical characteristics of alluvial material with high porosity comprised in the range of 20 to 60% with hydraulic conductivity in the range of 100 to 1000 (m/d) and is also rich in organic matter, in particular black peat.

A layer with the desired characteristics can be easily obtained by those skilled in the art, in particular by mixing alluvial materials with organic materials. It is also possible, in particular by means of grinding and/or drying operations, to obtain a layer with the desired properties from organic material such as peat or compost.

This layer can, according to the planned depollution, act as a vegetation-support layer or consist of an intermediate layer located between the draining layer and the vegetation-support layer, in particular in the case of depolluting polluted soil.

This layer makes it possible, due to its high contents of organic material, to immobilise the non-degradable polluting elements, especially the metal elements, and to feed the anaerobic reactions during irrigation periods and, due to the features it shares with alluvial material, to obtain quick saturation with water during the irrigation phases. The speed of this saturation with water allows a considerable variation of the redox potential of this layer in a short period of time, which also boosts the transition of the metal elements or stable inorganic pollutants trapped in the latter towards a soluble cationic or anionic form. This transition therefore facilitates the washout of this layer and the consecutive evacuation of these leachates into a trapping filter.

The amount of organic material in said layer can be easily determined so that the anaerobic reactions can benefit from a sufficient substrate.

According to a specific embodiment of the method according to the invention, the method also comprises a step of adding acidifying products or natural acids, preferably completely biodegradable, to the planted filter bed during the irrigation periods. These acidifying products are preferably added to the irrigation water. The addition of these acidifying products makes it possible, by modifying the pH, to increase the redox potential difference in the planted filter bed between the dry and irrigated period, and thus to increase the dissolution of non-degradable elements and, in particular, of the metal elements present, and their leaching during the step of washing out the planted filter bed.

Such an addition can be carried out easily using a feed pump, the likes of which are well known to those skilled in the art.

The amount of acidifying products added to the filtering mass is such that the pH value of the filtering mass, which is in the range of 7 to 9 and preferably of 7 to 8 prior to the addition of the acidifying products, is reduced in the range of 4 to 7, preferably of 5 to 7.

The acidifying products used, which are completely biodegradable, are advantageously chosen from among naturally occurring acids, preferably from among organic acids, such as citric, oxalic or malic acid; the acidifying product is preferably citric acid.

In the case of these organic acids, and in particular in the case of citric acid, in addition to adjusting the pH of the planted filter bed, they further improve the elimination of non-degradable polluting elements and, in particular, of metal elements present in the planted filter bed by forming salts with the latter. The effectiveness of the leaching step is thereby improved.

Advantageously, the method according to the invention also comprises a step of evacuating the leachates from the draining layer of the planted filter bed to a trapping filter, which is advantageously smaller in size.

This evacuation is conducted simply means of a channel connecting the draining layer at the base of the planted filter bed to the trapping filter. This channel can preferably be in the form of a drain, at least the portion thereof located at the base of the planted filter bed.

The evacuation of the leachates into the trapping filter is advantageously controlled by a gate positioned on the channel connecting the planted filter bed and said trapping filter. The opening and closing of this gate improves, upon closing it, the speed of the transition from the aerobic phases to the anaerobic phases in the planted filter bed and, by opening, the speed of the transition from the anaerobic phases to the aerobic phases.

The trapping filter concentrates the pollutants evacuated from the planted filter bed during each drying/irrigation cycle, and thus considerably increases the speed of depollution. It is therefore possible easily to replace this trapping filter without affecting the planted filter bed.

The trapping filter can be in the form of an enclosure comprising components that are capable of immobilising non-degradable pollutants and, in particular, metals. Examples of such compounds include scoria, phosphates, beringite and steel filings.

The trapping filter can also be in the form of a planted filter bed, which then comprises a draining layer and a layer that acts as a support for the vegetation, essentially made up of organic material as described above, preferably of peat, so as to be able to fix the non-degradable pollutants and, especially, the metallic elements present in the leachates coming from the first planted filter bed. It is also possible to set up a planted filter bed that does not have a draining layer as its trapping filter.

According to a specific embodiment of the method according to the invention, in particular in the case of treating wastewater, the method also comprises the evacuation of treated water.

Said evacuation is conducted simply by means of a channel connecting the trapping filter, and more specifically the draining layer of the latter in the case of a trapping filter in the form of a planted filter bed, to the desired evacuation site.

Said evacuation is advantageously controlled by a gate that allows the release of the water present in the trapping filter after trapping the non-degradable pollutants and, in particular, the metal elements in the latter.

Such an evacuation can be performed, in particular, into the natural environment, into a planted filter bed as described above, repeating the steps described above, or even into an area for infiltration and evaporation, which minimises or ensures zero waste in the natural environment, an area which can be planted, in particular, with willow, alder, poplar and/or birch or various aquatic plants.

The invention also relates to a device for treating polluted soil or sludge implementing the method described above and comprising:
- a vegetated compartment comprising a planted filter bed comprising a draining layer at the base of the compartment and a second layer providing a support for the vegetation;
- feeding of the vegetated compartments, either to transport the water or to transport the wastewater or liquid sludge, said feeding advantageously being coupled with a gate in order to define aerobic or anaerobic periods in said planted filter bed; and
- a trapping filter connected to the draining layer of the planted filter bed.

The various elements of the device are isolated from the soil by means of watertight means, which are well known to those skilled in the art and comprise, in particular, films made from a plastic material.

The vegetation of said planted filter bed is similar to that of wet environments with wet formation (such as Alnio-padion) protected by the RAMSAR convention, such as common reed (*Phragmite communis*), rush (*Scirpus communis*), sedge (*Carex acutiformis*), iris (*Iris speudaocorus*), willow (*Salix viminalis*), alder (*Aulnus glutinosa*) or black cherry (*Prunus padus*).

The structure of the draining layers is well known to those skilled in the art. As an example, such a layer is generally made up of pebbles or blocks of washed materials.

This draining layer advantageously has a thickness of 10 to 100 cm, preferably from 15 to 50 cm and, in a particularly preferred manner, from 20 to 30 centimeters.

The draining layer advantageously comprises recovery drains.

The draining layer is connected by a channel to the trapping filter. Said channel preferably acts as a recovery drain in the draining layer of the planted filter bed.

Also advantageously, said channel is equipped with a gate, of a type well known to those skilled in the art, which allows more efficient control of the evacuation of leachates into the trapping filter and improves the definition of aerobic or anaerobic periods in the filter bed.

According to a preferred embodiment of the device according to the invention, the planted filter bed comprises a layer, other than the draining layer, comprising material which can be organic, such as black peat or compost, or alluvial. Said layer can be the vegetation-support layer, or an intermediate layer between the draining layer and the vegetation-support layer.

Said layer advantageously has the physical characteristics of alluvial material with high porosity comprised in the range of 20 to 60% with hydraulic conductivity in the range of 100 to 1000 (m/d) and is also rich in organic matter, in particular black peat.

A layer with the desired characteristics can easily be obtained by those skilled in the art as described previously.

This layer advantageously has a thickness of 10 to 150 cm, preferably from 15 to 100 cm and, in a particularly preferred manner, from 20 to 50 centimeters.

According to a specific embodiment of the device according to the invention, the vegetation-support layer consists of the polluted sludge or soil to be treated.

This layer then has a thickness of 50 to 200 cm, preferably from 50 to 150 cm and, in a particularly preferred manner, from 50 to 100 cm.

In this case, the layer comprising organic material, such as black peat or compost, or alluvial material consists of an intermediate layer between the draining layer and the layer that provides the support for the vegetation.

According to another specific embodiment of the device according to the invention, the vegetation-support layer consists of the layer comprising material which can be organic, such as black peat or compost, or alluvial.

According to a second preferred embodiment of the device according to the invention, the draining layer of the planted filter bed is connected to an aeration system. This aeration system, which can be in the form of vents, connected to the base of the planted filter bed by means of sheaths or channels, enables improved efficiency of the drying periods and, therefore, aerobic reactions throughout the entire planted filter bed.

Said aeration system can, in particular, be connected to the recovery drains arranged in the draining layer.

Advantageously, the planted filter bed uses a vertical-type filtration system from the draining layer towards the support layer or vice-versa.

According to a third preferred embodiment of the device according to the invention, the latter also comprises an intake for polluted air, which opens into the draining layer of the planted filter bed. Said intake can, in particular, be in the form of Controlled Mechanical ventilation (CMV). Said intake is advantageously coupled with a gate so as to be able to define aerobic or anaerobic periods in said planted filter bed.

Also advantageously, the draining layer of the filtering mass is associated with an aeration system. This aeration system can, in particular, be in the form of vents located on the surface of the planted filter bed, vents which are connected to the draining layer and/or to the drains in such layer by means of channels.

According to a fourth preferred embodiment of the device according to the invention, it also comprises an intake of acidifying products or natural acids for the vegetated compartments, which are preferably entirely biodegradable.

This intake is preferably coupled to the water, wastewater or sludge intake of the vegetated compartments.

This intake is advantageously coupled with a feeder pump of a type well known to those skilled in the art, so that the amount of acidifying products added to the planted filter bed is such that the pH value of the planted filter bed, which is in the range of 7 to 9 and preferably of 7 to 8 prior to the addition of the acidifying products, is reduced in the range of 4 to 7, preferably of 5 to 7.

Also advantageously, the completely biodegradable acidifying products used to supply the planted filter bed are chosen from among naturally occurring acids, preferably from among organic acids, such as citric, oxalic or malic acid; the acidifying product is preferably citric acid.

The trapping filter of the device according to the invention concentrates the pollutants evacuated from the planted filter bed during each drying/irrigation cycle, and thus considerably increases the speed of depollution.

The trapping filter can be in the form of an enclosure comprising components that are capable of immobilising non-degradable pollutants and, in particular, metals. Examples of such compounds include scoria, phosphates, beringite and steel filings.

According to a fifth preferred embodiment of the device according to the invention, the trapping filter is in the form of a planted filter bed, which then comprises a layer that acts as a support for the vegetation, made up essentially of organic material as described above, preferably of peat, so as to be able to fix the non-degradable pollutants and, especially, the metallic elements present in the leachates coming from the first filtering mass. Said planted filter bed can also comprise a draining layer.

According to a sixth preferred embodiment of the device according to the invention, the device also comprises means for evacuating the water present in the trapping filter.

Said evacuation means are advantageously in the form of a channel which, when the trapping filter is in the form of a planted filter bed, is connected to the draining layer of the latter.

Also advantageously, said evacuation means is controlled by a gate that allows the release of the water present in the trapping filter after effectively trapping the non-degradable pollutants and, in particular, the metal elements in the latter.

Said evacuation means can allow the treated effluent to be released into the natural environment.

According to a specific embodiment of the device according to the invention, devices according to the invention are placed in a serial configuration in the same installation. The evacuation means connected to the trapping filter of a first device then consists of the intake of a planted filter bed of a second device placed downstream.

According to a second specific embodiment of the device according to the invention, the device also comprises, downstream from the trapping filter, an infiltration and evaporation area, which can, in particular, be planted with willow, alder, poplar and/or birch, and which is connected to a trapping filter by evacuation means. This latter area makes it possible to minimise waste in the natural environment.

The appended drawings illustrate the invention:

Figure 11:
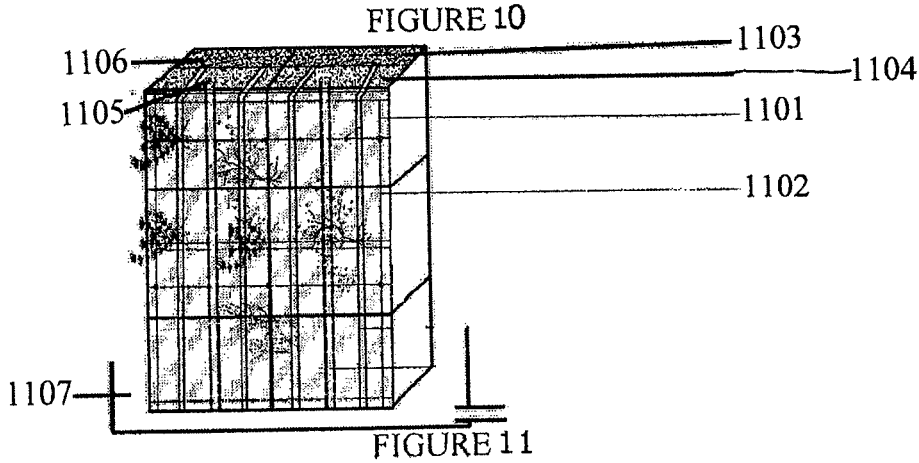

FIG. 11 provides an example of a vertical planted filter bed for air with an internal irrigation system.

Figure 1:
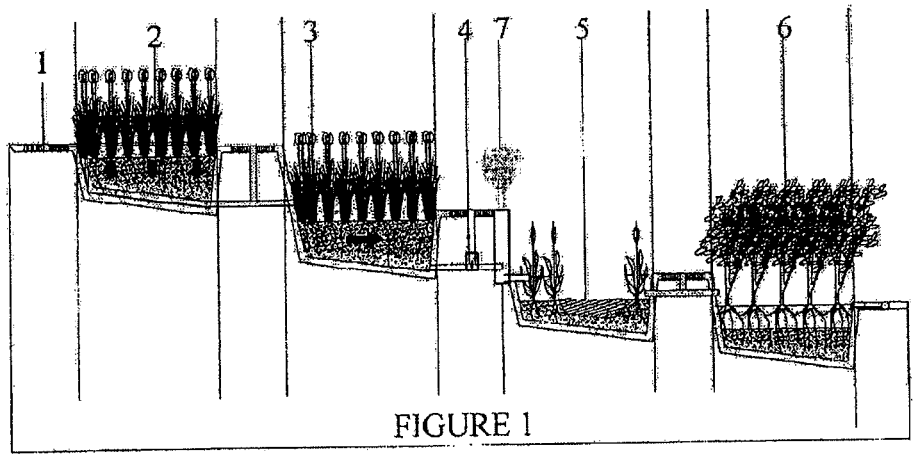
FIG. 1 shows a rough cross-section of the entire device for treating water by phytoleaching and phytofixation.

In reference to FIG. 1, the cross-section of the entire device shows, first of all, the principle of circulation of the effluent to be treated. The water intake is located at the start of the system. The water passes through a first series of vertical filters (2) made up of a draining layer of gravel and a filtering layer (mix of granular peat and pozzolana) planted with reed, rush and iris. The water then flows into the second series of horizontal filters (3) which have the same two types of layers of materials before flowing from an adjustment gate (4) into the hydraulic adjustment basin (5). The outlet of the basin contains the infiltration and evapotranspiration area (6) planted with willow, alder, poplar and birch. Between the outlet of the horizontal planted filter beds and the adjustment basin is located the trapping filter (7) which makes it possible to trap the trace metal elements or certain compounds such as, for example, phosphorous.

Figure 2:
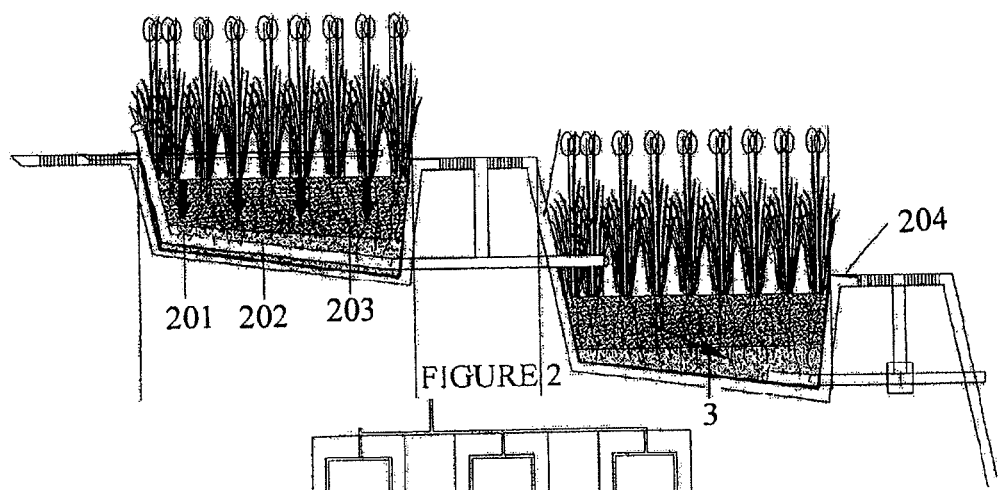
FIG. 2 shows a cross-section of the first type of vertical planted filter bed (or vegetated filter), a cross-section of the horizontal filter and a gate for adjusting the level of water in the two types of water treatment filters.

FIG. 2 shows a cross-section of two types of planted filter beds (vertical and horizontal). The planted filter bed of the two types of filter, vertical and horizontal, is made up of two types of materials arranged in stacked layers. The base of these two types of compartments includes the draining layer (201), essentially made up of thick pebbles, coarse gravel or blocks of washed material, over around 25 centimeters. This is the layer where the recovery drains (202) of the treated effluent are placed. The drains in the vertical filter are connected to vents, which also provide the aeration of this filter, which is aerobic. The second layer (203) of 30/50 cm consists of filtering material, such as granular peat, pozzolana and sand, if required. These two types of layers are also used for the horizontal filter (3) which is horizontal due to the direction in which the water flows. The entire compartment is made watertight with a watertight complex (204) preferably made up of a geomembrane.

Figure 3:
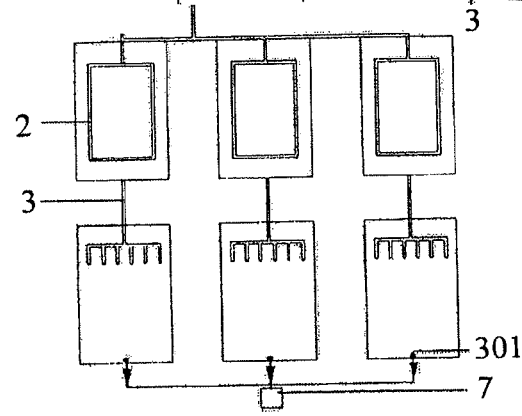
FIG. 3 shows a cross-section of the hydraulic adjustment basin.

As regards FIG. 3, the block plan of the device shows the intake system of the vertical filter (2). It is in the shape of a closed loop to allow perfect distribution of the effluent. It can also be removed for cleaning purposes. The vertical filter drains are directly connected to the horizontal filters (3). The drains for recovering effluent from the horizontal filters are directly connected to the trapping filter (7). Every horizontal filter has a gate (301) for closing off the circulation of the water and increasing the flooding time as required. The horizontal and vertical compartments and the hydraulic adjustment basin contain a mixture of wetland plants, which include: common reed (*Phragmite communis*), rush (*Scirpus communis*), sedge (*Carex acutiformis*), iris (*Iris speudaocorus*).

Figure 4:
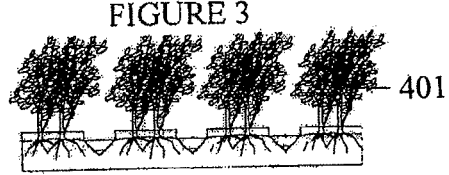
FIG. 4 shows the infiltration and evapotranspiration area in the form of an artificial wet forest.

FIG. 4 shows the cross-section of the infiltration and evapotranspiration area. Various types of shrubs (401) from wet environments are used. These include willow (*Salix viminalis*), alder (*Aulnus glutinosa*), and black cherry (*Prunus padus*). This is a type of wetland plant formation (Alniopadion type) protected by the RAMSAR convention.

The whole device is sized according to the volume of liquid effluent to be treated on the basis of 150 liters per inhabitant equivalent and an average of 2 to 12 m$^2$ per inhabitant equivalent on average in France. This device can be used for urban, farming and industrial wastewater.

The design of these planted filter beds allows perfect management of the factors in the recreated artificial environment, namely oxidoreduction and pH. Oxidoreduction is controlled by means of the planted filter bed, which has good aeration and by means of the compartment feeding system, which makes it possible to take full control of the planted compartment and its irrigation so as to define aerobic and anaerobic periods.

Figure 5:
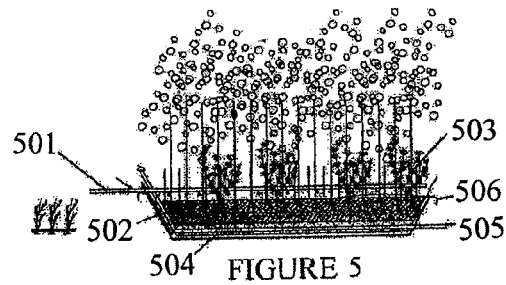
FIG. 5 shows a cross-section of the pollutant-trapping filter.

In reference to FIG. 5, the filter for trapping pollutants (phosphates, non-biodegradable micro-pollutants, metal trace elements, etc.) comprises a single drain for intaking leachates (501), a filtering layer (502) made up of organic material, also promoting the installation of wetland plants (503), which are essential for maintaining the permeability of the environment. This filtering layer can have a depth of between 0.70 and 2 meters and is a key element of the filter. It is made up of a mix of granular, organic and silty materials for fixing the pollutants and their carrier phase by adsorption and by changing the chemical form of the pollutants (mineral forms, non-bioavailable metal forms, etc.). These materials also include fertilisers. The base of the filter includes a draining layer (504) of blocks of pebbles over 0.30. This latter layer includes the leachate outlet drain (505). This is an environment on the limit of anorexia. This is a watertight compartment with a watertightness complex (506) generally made from a geomembrane.

Figure 6:
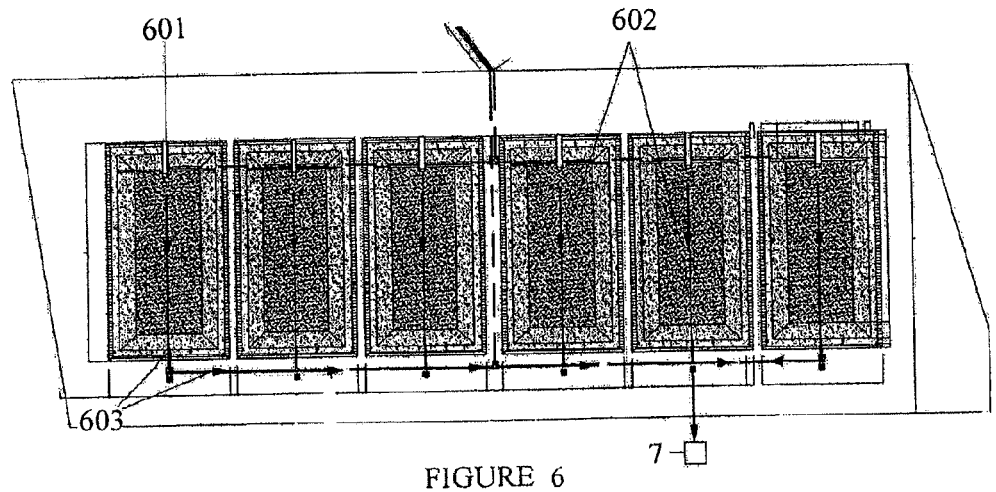
FIG. 6 shows the general block plan of the device for depolluting soil or urban sludge by phytoleaching and phytofixation.

In reference to FIG. 6, the general plan of the device for treating polluted soil comprises a system for supplying vegetated compartments (601), either to transport liquid sludge, or to transport irrigation water. It is to this feeding system that the natural acids are added. The polluted material, in particular in the case of polluted soil, can be deposited in a single action in several treatment compartments (602). A network of underground drains (603) recovers the leachates coming from the compartments and loaded with remobilised pollutants. These leachates are transported to the pollutant trapping filter (7).

Figure 7:
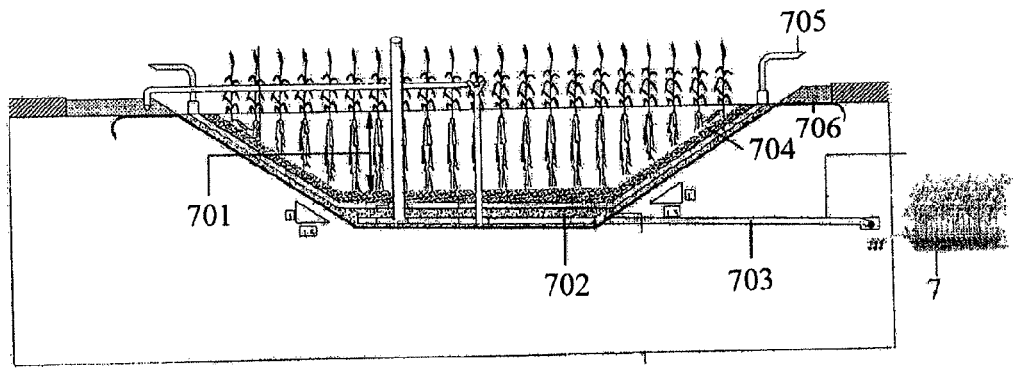
FIG. 7 shows a cross-section of the compartment for treating the polluted materials.

In reference to FIG. 7, the cross-section of a treatment compartment shows the thickness of the material (701) to be treated, which cannot be more than 1.2 meters thick in any case. The planted filter bed consists of two types of materials arranged in stacked layers. The base of the compartment includes the draining layer (702), essentially made up of thick pebbles or blocks of washed material, over around 20 to 30 centimeters. This is the layer which contains the drains (703) that recover the leachates, which also constitute the first aeration. The second layer (704), of 20 to 30 cm, is made up of granular filtering material such as pozzolana, granular peat or organic material (black peat, compost, etc.). It is in this last layer of the filtering mass that the second aeration system (705) is located, made up of drains directly connected to the vents that act as small aeration stacks. The entire compartment is made watertight with a watertight complex (706) preferably made up of a geomembrane. The irrigation water or leachates are then directed towards the trapping filter (7).

Figure 8:
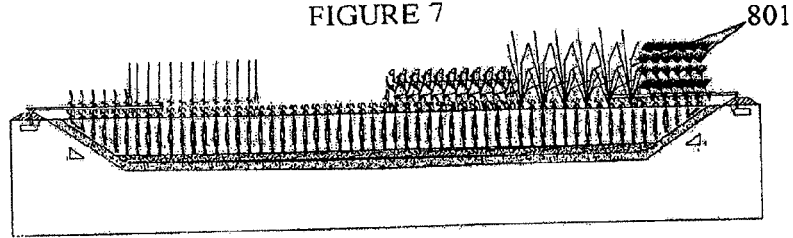
FIG. 8 shows the installation of various vegetable species to stimulate the rhizosphere.

In reference to FIG. 8, showing the treatment compartment with the plants (801), the device is based on a mix of wetland plants, including: common reed (*Phragmite Communis*), rush (*Scirpus communis*), sedge (*Carex acutiformis*), iris (*Iris speudaocorus*), willow (*Salix viminalis*), alder (*Aulnus glutinosa*), black cherry (*Prunus padus*), types of wet formations (Alnio-padion type) protected by the RAMSAR convention.

The entire device is sized according to the volume of polluted material to be treated. This device can apply to urban sludge, cleaning products, contaminated soil and any type of industrial (oil, mining, steelworks, processing, paper, etc.) or farming (liquid manure, white water, wine-production waste, etc.) pollutants.

Figure 9:
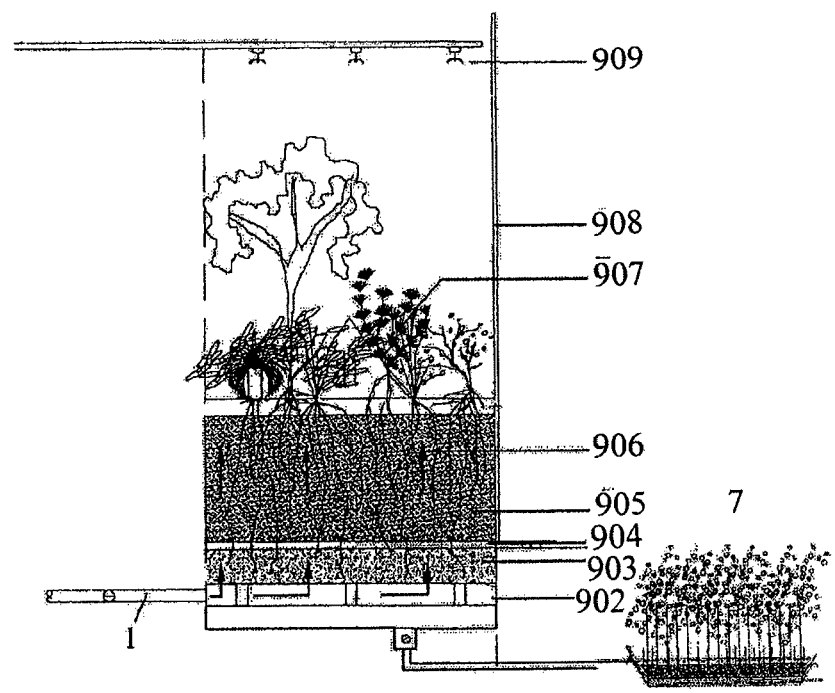
FIG. 9 shows the typical cross-section of a horizontal planted filter bed for air.

As regards FIG. 9, the planted filter bed for treating air comprises a polluted air intake (1) (at the bottom, which allows the air to be pulsed through the planted filter bed). The gases pass through a grating (902), a draining layer (903) made of pebbles or gravel and then a geogrid (904) before reaching the filtering layer (905). The air continues to rise through the filtering mass, passing through a bed of fixing organic matter (906) and 5/20 pozzolana (0m 10). The pozzolana acts as a support for the settlement of bacterial flora which participates in decomposing the greenhouse gases ($NO_2$, $CO$, etc.) and the polluted gases. This essentially organic filtering layer is planted on the surface with fixing plants (907). The vegetation can be in the open air or protected by a glass section (908) to create a greenhouse. In every case, an irrigation system, which can be mounted on the ceiling (909) or placed at the feet of the plants is provided. At the bottom of the filter, a water recovery system is provided for treating the leachates in a trapping filter (7).

Figure 10:
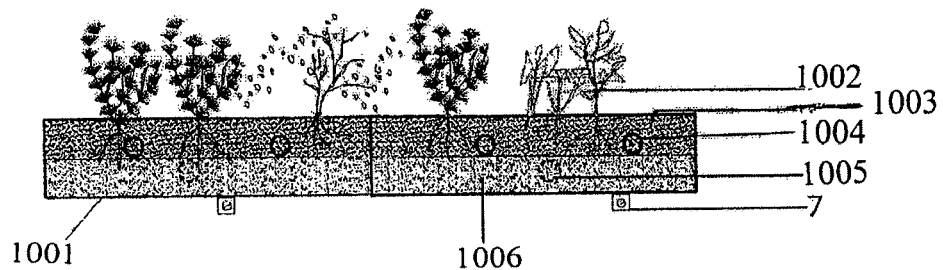
FIG. 10 shows a detailed cross-section of a filtering plant wall.

In reference to FIG. 10, the installation of small planted compartments makes it possible to create a system for filtering air, which can be placed on the roofs of buildings or in the form of a filtering vertical plant wall. The compartment (1001) can be made up of small PVC trays with anti-corrosion treatment, or small galvanised or stainless-steel metal compartments. The vegetation (1002) is installed on the filtering layer (1003). A humidification device integrated by means of a homogeneous network of irrigation micro-drains (1004) is installed in the filtering layer, which is also the plantation substrate. The drains for intaking polluted air (1005) are installed in the draining layer (1006). In the base of the compartment or of the PVC tray, a recovery of leaching water is provided for treating this water in a trapping filter (7), if required.

In reference to FIG. 11, the installation has a vertical filtering plant wall which is self-supported by means of a system of welded rigid gabions (1101). Inside the gabions, the draining and filtering layer is supported by two sheets (1102) fixed to the grid of the gabions by single joints. The sheet supporting the filtering layer (1103) is a simple plantation layer and the sheet supporting the draining layer (1104) is a waterproof plastic canvas with anti-corrosion treatment. The polluted-air intake drains (1105) are in the draining layer and the irrigation drains (1106) are in the filtering layer. A tray (1107) for recovering water is located at the bottom of the wall.

Further advantages and characteristics of the invention will appear in the following examples relating to the preparation of dry microspheres containing perfume and compact powders containing such microspheres.

EXAMPLE 1

Installation for Treating Polluted Soil

1) Principle:

The operation of a Filtering Garden is based on the principle of ex situ phytoremediation in vegetated compartments by means of two consecutive treatment steps.

First step: Phytostimulation/ahizofiltration
    Principles of operation at the compartment level:
    alternating irrigation,
    vertical flow with downward movement,
    aerobic conditions.
    Main functions:
    Filtration of soil through the planted filter bed coupled with rhizofiltration/rhizodegradation by the root tissue of the plants (in particular of macrophyte plants).
    Biodegradation/mineralisation of the organic matter by the micro-organisms associated with the plants.

The compartments of the first step are subjected to alternating cyclic irrigation. The alternation of periods of hydromorphy and drying modulates the conditions of oxidoreduction and controls the aerobic/anaerobic reactions. A long enough drying period reoxygenates the compartments in order to control the aerobic reactions, reinforced by artificial aeration using a system of stacks.

Second Step: Phytofixation/Phytoextraction

Principles of operation at the compartment level:

vertical flow with upward movement, anaerobic/aerobic conditions, continuous feeding.

Main functions:

Trapping of metal elements on the fixing mass (peat bed) coupled with phytosequestration by plants.

Evapotranspiration of drainage water.

2) Organisation of the Device:

The device consists of five experimental compartments. All the compartments are embedded in the ground and isolated from the rest of the ground by a watertight complex. The compartments A, B, C and D are terraced with regard to compartment E, which enables the use of gravity to transfer drainage water to the compartment E.

The four compartments of the first treatment step (A, B, C and D) contain polluted soil: 3 t per compartment. The central compartment E permanently guarantees the collection of drainage water on a peat bed.

The main characteristics of the device are as follows:

| | |
|---|---|
| Number of experimental compartments | 5 |
| Depth of the compartments | 1 m |
| Effective area of the compartment (4 × 4 m at the bottom) | 4 × 4 m |
| Available volume of the compartment | 6 m$^3$ |
| Covered area of the 5 compartments | 80 m$^2$ |
| Polluted soil treated | 15 t |

3) Procedure:

The four treatment compartments are subjected to alternating cyclic irrigation which consists of a series of irrigations during five days, with a water contribution of 1600 liters per compartment, performed during the irrigation week, followed by a drying period (1 week for compartment B and 3 weeks for compartments A, C and D). The contribution of irrigation water is carried out using a tank with a constant volume which makes it possible to overcome daily variations. Citric acid is added to compartments A, B and C so that the pH value in these compartments is comprised between 5 and 7 during the irrigation periods.

The soil in the compartments is dehydrated during the drying period by means of the draining system (planted filter bed with drains) in the bottom of the compartments. The drainage water coming from the four compartments (loaded with soluble fractions in dissolved form and with fine fractions in suspension) is recovered by a system of drains perforated in the bottom of the compartment and sent, by the pull of gravity, into compartment E.

4) Results:

The results have shown that the soil in the various trays that underwent acid treatment as well as concurrent irrigation/drying cycles have a very low concentration of pollutants, including metals. In the absence of acid treatment, a similar reduction of the concentration of pollutants was observed, but to a smaller degree.

The analysis of the soil in compartment E corresponding to the trapping filter shows that the pollution concentrates in the peat layer of the latter.

EXAMPLE 2

Installation for Treating Polluted Water

1) Device

A similar device was implemented with a first vertical reed-planted filter bed equipped with vents connected to its draining layer made up of pebbles, filtering mass which is supplied with wastewater that has been pre-treated by screening. The intake is coupled with an outlet gate so as to regulate the irrigation and drying periods. Irrigation takes place for 4 hours per day followed by an 18-hour drying period. The intake is also coupled with a feeder pump containing citric acid and making it possible to obtain a pH value comprised between 5 and 7 during the irrigation periods in the filtering mass.

A channel connects the draining layer of the planted filter bed to a trapping filter. Said channel is equipped with a gate that makes it possible to prevent the passage of liquids from the planted filter bed to the trapping filter when feeding the filtering mass.

The trapping filter consists of a planted filter bed made up of a draining layer and a peat-based vegetation-support layer, which is planted with reed and peat.

Finally, the trapping filter is connected by a channel, also equipped with a gate allowing the latter to be kept in an anaerobic environment, to an area for evaporation and infiltration of treated wastewater planted with willow, ash and alder.

2) Results

The results obtained with the device described above are as follows:

| Component | Incoming flow | Outlet from the filtering gardens |
|---|---|---|
| Matter in suspension (MIS; mg/l) | 11,500 | 11 |
| DCO (mg/l) | 11,200 | 41 |
| Biological oxygen demand (BOD; mg/l) | 8,700 | 53 |
| Dissolved hydrocarbons | 51 | 0.2 |
| HAP (mg/l) | 0.1 | 0.002 |
| NTK (mg/l) | 2.1 | 1.4 |
| Pt (mg/l) | 1.7 | 0.9 |
| Copper | 360 | 5 |
| Lead | 211 | 31 |

The results show that the device according to the invention makes it possible to obtain considerable depollution of wastewater fed into the filtering garden, depollution which is effective for all the tested pollutants.

The invention claimed is:

1. Method of depollution by phytoremediation intended for treating wastewater, polluted air or soil comprising:
introducing the pollutants in solid, liquid or gaseous form in a planted filter bed;
irrigating said planted filter bed so as to define aerobic or anaerobic periods, wherein said step of irrigating allows saturation of the planted filter bed with water during the anaerobic period and in that the organisation of the cyclic irrigation period corresponds to a succession of irrigation/drying periods of the planted filter bed, the irrigation/drying periods being distributed with a ratio of 2/1 to 1/50; and adding acidifying products or natural acids to the planted filter bed during the irrigation periods, wherein the amount of acidifying products added to the planted filter bed is such that the pH value of the planted filter bed, which is in the range of 7 to 9 prior to the addition of the acidifying products, is reduced in the range of 4 to 7.

2. Method according to claim 1, characterised in that the irrigation/drying periods are distributed with a ratio of 1/1 to 1/20.

3. Method according to claim 1, characterised in that the planted filter bed uses a vertical-type filtration system.

4. Method according to 1, characterised in that the draining layer of the planted filter bed is associated with an aeration system.

5. Method according to 1, characterised in that the planted filter bed comprises a layer, other than the draining layer, having the physical characteristics of alluvial material with high porosity comprised in the range of 20 to 60% and hydraulic conductivity in the range of 100 to 1000 (m/d), said layer being also rich in organic matter.

6. Method according to claim 1, wherein the acidifying products or natural acids are completely biodegradable.

7. Method according to claim 1, characterised in that the acidifying products used are chosen from among said natural acids.

8. Method according to claim 7, wherein the natural acids are organic acids.

9. Method according to claim 8, wherein the organic acids are selected from the group consisting of citric, oxalic and malic acid.

10. Method according to claim 1, characterised in that it also comprises a step of evacuating the leachates from the draining layer of the planted filter bed to a trapping filter.

11. Device for treating polluted sludge or soil implementing the method according to claim 1 and comprising:

a vegetated compartment comprising a planted filter bed comprising a draining layer at the base of the compartment and a second layer providing a support for the vegetation;

feeding of the vegetated compartments, either to transport the water or to transport the wastewater or liquid sludge, said feeding being coupled with a gate in order to arrange aerobic or anaerobic periods in said planted filter bed;

a trapping filter connected to the draining layer of the planted filter bed; and feeding of the vegetated compartments with acidifying products or natural acids.

12. Device according to claim 11, characterised in that the planted filter bed comprises a layer, other than the draining layer, having the physical characteristics of alluvial material with high porosity comprised in the range of 20 to 60% with hydraulic conductivity in the range of 100 to 1000 (m/d), and is also rich in organic matter, in particular black peat.

13. Device according to claim 11, characterised in that the draining layer of the planted filter bed is connected to an aeration system.

14. Device according to claim 11, characterised in that the planted filter bed uses a vertical-type filtration system from the draining layer towards the support layer or vice-versa.

15. Device according to claim 11, characterised in that the trapping filter is in the form of a planted filter bed, which then comprises a draining layer and a layer that provides support for the vegetation, which is essentially made up of organic matter.

* * * * *